United States Patent [19]

Ochiumi

[11] Patent Number: 4,749,607
[45] Date of Patent: Jun. 7, 1988

[54] THERMOPLASTIC HALOCARBON POLYMER LAMINATES

[75] Inventor: Masahide Ochiumi, Mie, Japan

[73] Assignee: Mitsubishi Petrochemical Co., Ltd., Tokyo, Japan

[21] Appl. No.: 874,664

[22] Filed: Jun. 16, 1986

[30] Foreign Application Priority Data

Jun. 15, 1985 [JP] Japan .................................. 60-129133

[51] Int. Cl.$^4$ .......................... B32B 7/02; B32B 15/08; B32B 27/08; B32B 27/36
[52] U.S. Cl. ..................................... 428/215; 428/349; 428/412; 428/421; 428/422; 428/424.6; 428/461; 428/476.1; 428/483; 428/516; 428/517; 428/518; 428/913
[58] Field of Search .............. 428/421, 422, 913, 349, 428/215, 424.6, 412, 483, 517, 518, 516, 476.1, 461

[56] References Cited

U.S. PATENT DOCUMENTS 4,588,642 5/1986 Ochiumi .............................. 428/421

Primary Examiner—Thomas J. Herbert
Attorney, Agent, or Firm—Oblon, Fisher, Spivak, McClelland & Maier

[57] ABSTRACT

A laminate of a thermoplastic halocarbon polymer which comprises a laminate of a modified thermoplastic halocarbon polymer incorporating at least one functional group (a) selected from the group consisting of a carboxyl group, an acid anhydride group, a hydroxyl group and an epoxy group and a modified β-olefin-series polymer incorporating at least one functional group (b) which is selected from the above-defined group but which differs from the functional group (a).

The laminate of the present invention has high peeling strength and exhibits the advantages of the thermoplastic halocarbon polymer in combination with the inherent properties of the β-olefin-series polymer with which it is laminated.

14 Claims, No Drawings

THERMOPLASTIC HALOCARBON POLYMER LAMINATES

FIELD OF THE INVENTION

The present invention relates to laminates having one or more layers of a thermoplastic halocarbon polymer which have strong interlayer cohesion or high peeling strength.

BACKGROUND OF THE INVENTION

Fluorocarbon polymers in the category of thermoplastic halocarbon polymers generally have superior resistance to solvents and absorb no water at all. In addition, fluorocarbon polymers have the highest degree of resistance to weathering, heat and abrasion and exhibit the lowest degree of stickiness of all plastics.

Polytetrafluoroethylene (PTFE) is a representative fluorocarbon polymer. Because of its high resistance to heat and solvents, PTFE is used as a protective coat to prevent corrosion on the inner surfaces of pipes and as packings in chemical apparatus. PTFE also has low dielectric constant and dielectric loss while exhibiting high electrical resistivity so it is used as an insulator on electric cables. In addition, PTFE has high surface lubricity and is employed in making bearings and sliding members that require no lubrication. However, PTFE has a high melting point and cannot be easily molded by melt-forming techniques; therefore, PTFE must usually be formed by sintering procedures. With a view to improving the moldability of PTFE, copolymers of tetrafluoroethylene with other unsaturated monomers or fluorine-containing unsaturated monomers other than tetrafluoroethylene have been proposed. Furthermore, non-tetrafluoroethylene series fluorocarbon polymers which are thermoplastic and yet exhibit properties similar to those of PTFE have been developed.

Despite their superior properties, PTFE and the improved fluorocarbon polymers are expensive and their use will not be expanded unless they are laminated with inexpensive substrates. The problem, however, is that fluorocarbon polymers are non-adhesive and involve considerable difficulty in terms of being bonded to substrates. A variety of techniques have been studied in order to provide fluorocarbon polymers with improved adhesion to substrates. One approach is to modify the surfaces of fluorocarbon polymers by either the wet process wherein the surfaces of molded fluorocarbon polymers are treated with solution of alkali metals or by dry processes such as corona discharge, plasma discharge and sputter etching. According to other approaches, the surface of a fluorocarbon polymer is eroded by a special solvent that dissolves the polymer and the so treated fluorocarbon polymer is bonded to substrates; alternatively, the fluorocarbon polymer is physically bonded to substrates by sandwiching a glass mat.

Adhesive polymers which can be used as substrates to be bonded to fluorocarbon polymers have also been proposed. Among the polymers known as such adhesive substrates are certain ethylene-ethyl acrylate copolymers, ethylene-vinyl acetate copolymers and modified products thereof [see Japanese Patent Application Laid-Open Nos. 86748/81 and 12645/82]; epoxy-containing polyolefins [Japanese Patent Application Laid-Open Nos. 8155/82 and 212055/82]; and compositions comprising methyl methacrylate polymers grafted with vinylidene fluoride and methyl methacrylate series polymers [Japanese Patent Application Laid-Open No. 12646/82].

Chlorocarbon polymers as thermoplastic halocarbon polymers are generally flame-retardant, have superior resistance to water, acids and alkalis, are stable in many organic solvents and exhibit superior barrier properties against various gases and water vapor. Polyvinyl chloride (PVC) and polyvinylidene chloride (PVDC) are two representative chlorocarbon polymers.

PVDC has a softening point which is very close to the heat decomposition point and the plasticizers and stabilizers that can be used with PVDC are limited. Therefore, in order to provide PVDC having improved moldability, vinylidene chloride is copolymerized with such monomers as vinyl chloride, acrylonitrile and acrylate esters. PVDC is currently used in textile products such as fishing nets, insect-screen nets and tents, as well as in packing films, and coating latices.

PVDC has superior gas barrier properties but it is expensive and does not exhibit satisfactory degrees of heat resistance and stiffness when used alone. Therefore, in the food packing industry, PVDC is used in the form of coatings of dispersions or, alternatively, it is laminated with substrates such as polyolefins by coextrusion molding. Illustrative uses of PVDC are as films and containers. In the case of containers, a dispersion of PVDC is difficult to apply and requires a drying step. In order to avoid this complexity of operations, it is desirable to fabricate PVDC containers by the simpler coextrusion molding rather than the coating of dispersions.

PVDC is not highly adhesive and attempts have been made to improve the adhesiveness of its dispersion to the substrates by introducing functional groups through copolymerization with other monomers. Adhesive polymers which are suitable for use as substrates that adhere to PVDC have been proposed and they include: ethylene-vinyl acetate copolymers [see Japanese Patent Application Laid-Open Nos. 66770/74 and 26876/78; and Japanese Utility Model Application Laid-Open No. 83339/78]; thermoplastic polyurethanes [Japanese Patent Application Laid-Open Nos. 106584/79 and 217151/85]; and certain polyesters [Japanese Patent Application Laid-Open No. 152085/79].

The thermoplastic halocarbon polymers proposed by the aforementioned prior art techniques are not completely satisfactory in terms of moldability, workability and adhesive strength and the types of substrates to which they can be bonded are limited. For example, Japanese Patent Application Laid-Open Nos. 86748/81 and 12645/82 disclose laminates of thermoplastic fluorocarbon polymers and ethylene-vinyl acetate copolymers; if, with a view to providing improved peeling strength, a large amount of vinyl acetate is introduced in the form of a copolymer with ethylene, the resulting copolymer has lowered mechanical strength and yet its bonding strength to the fluorocarbon polymer is not significantly improved. As for chlorocarbon polymers, they are in most cases laminated by coextrusion molding with ethylene-vinyl acetate copolymers as proposed in Japanese Patent Application Laid-Open Nos. 66770/74 and 26876/78 and in Japanese Utility Model Application Laid-Open No. 8339/78, wherein the ethylene-vinyl acetate copolymer is laminated with PVDC. Not only does the PVDC adhere poorly to polypropylene and high-density polyethylene but it also has such a low degree of heat resistance that it is unsuitable for use as a food packing material which must withstand high temperature sterilization as in boiling or retorting.

SUMMARY OF THE INVENTION

The present inventors made concerted efforts to eliminate the aforementioned defects of the prior art thermoplastic halocarbon polymer laminates. As a result, it was found that laminates having significantly improved adhesive strength could be prepared from modified polymers of specified types. The present invention has been accomplished on the basis of this finding.

The present invention therefore relates to a laminate of a thermoplastic halocarbon polymer which comprises a laminate of a modified thermoplastic halocarbon polymer incorporating at least one functional group (a) selected from the group consisting of a carboxyl group, an acid anhydride group, a hydroxyl group and an epoxy group and a modified α-olefin-series polymer incorporating at least one functional group (b) which is selected from the above-defined group but which differs from the functional group (a).

DETAILED DESCRIPTION OF THE INVENTION

The modified thermoplastic halocarbon polymer forming one layer in the laminate of the present invention may be prepared from a chlorocarbon polymer such as vinyl chloride polymer, vinylidene chloride polymer, or any one of the chlorocarbon copolymers which contain these chlorides as principal components. Commercial products of these chlorocarbon polymers may be used as required. A vinylidene chloride polymer is particularly preferable.

The modified thermoplastic halocarbon polymer may also be prepared from a fluorocarbon polymer such as a vinyl fluoride polymer, a vinylidene fluoride polymer, polychlorotrifluoroethylene, an ethylene-tetrafluoroethylene copolymer, an ethylene-chlorotrifluoroethylene copolymer, a tetrafluoroethylene-hexafluoropropylene copolymer, a tetrafluoroethylene-propylene copolymer, or a tetrafluoroethylene-perfluoroalkyl vinyl ether copolymer. Commercial products of these fluorocarbon polymers may be used as required. A vinylidene fluoride polymer is particularly preferable. These fluorocarbon polymers may be used as blends with other polymers which are miscible with them. A known example of such blends is one of a vinylidene fluoride polymer and a methyl methacrylate polymer. The fluorocarbon polymers may of course be mixed with commonly employed inorganic fillers, additives, pigments, etc.

The modified thermoplastic halocarbon polymer which forms one layer in the laminate of the present invention is one of the above-listed thermoplastic halocarbon polymers or compositions thereof with incorporating at least one functional group (a) selected from the group consisting of a carboxyl group, an acid anhydride group, a hydroxyl group and an epoxy group.

The functional group (a) may be introduced into the thermoplastic halocarbon polymer by a variety of methods such as: a method wherein the thermoplastic halocarbon polymer is blended with a thermoplastic polymer which is miscible with said halocarbon polymer and which contains the functional group (a); a method wherein a polymerizable monomer having the functional group (a) is incorporated in the thermoplastic halocarbon polymer by either random, block or graft copolymerization; a method wherein the reactive group in the thermoplastic halocarbon polymer is reacted with a compound which has the functional group (a) or one which forms such functional group by reaction; and a method wherein the thermoplastic halocarbon polymer is modified by oxidation (thermal decomposition), hydrolysis or any other appropriate means. The first, second and fourth methods are preferable since they allow the functional group (a) to be readily introduced into the thermoplastic halocarbon polymer and because it is easy to control the amount of the functional group (a) to be incorporated.

An example of the thermoplastic polymer which has the functional group (a) and is miscible with the thermoplastic halocarbon resin is a copolymer of a monomer having the functional group (a) and a monomer, such as a methacrylate ester series monomer or an acrylate ester series monomer, which is capable of forming a polymer having miscibility with the thermoplastic halocarbon polymer.

Illustrative monomers having a carboxyl or acid anhydride group include acrylic acid, methacrylic acid, maleic acid, itaconic acid, maleic anhydride, itaconic anhydride, and hymic anhydride (3,6-endomethylene-1,2,3,6-tetrahydrophthalic anhydride). Acrylic acid and maleic anhydride are particularly preferable for the purpose of providing enhanced adhesion.

Illustrative monomers having an epoxy group include glycidyl acrylate, glycidyl methacrylate, glycidyl ethyl acrylate and glycidyl itaconate. Glycidyl acrylate and glycidyl methacrylate are particularly preferable because of their high reactivity.

A hydroxyl group is preferably introduced by hydrolyzing a copolymer of a vinyl ester such as vinyl acetate or vinyl propionate or by copolymerizing an unsaturated alcohol such as an ester of acrylic acid or methacrylic acid with a dihydric alcohol.

An example of the modified thermoplastic vinylidene chloride copolymer which is formed by a graft, random or block copolymerization includes a vinylidene chloride-acrylic acid copolymer, a vinylidene chloride-methacrylic acid copolymer, a vinylene chloride-2-hydroxyethyl acrylate copolymer, a vinylidene chloride-2-hydroxyethyl methacrylate copolymer, a vinylidene chloride-2-hydroxypropyl acrylate copolymer, a vinylidene chloride-2-hydroxypropyl methacrylate copolymer, a vinylidene chloride-hydroxyvinyl ether copolymer, a vinylidene chloride-glycidyl acrylate copolymer, a vinylidene chloride-glycidyl methacrylate copolymer, a vinylidene chloride-glycidyl vinyl ether copolymer, a vinylidene chloride-allyl glycidyl ether copolymer, and a multi-component copolymer formed from two kinds of monomers constituting each of the aforementioned copolymers and a monomer or monomers, capable of being copolymerized such as vinyl chloride, an alkyl acrylate, an alkyl methacrylate, acrylonitrile, etc.

An example of the modified thermoplastic vinylidene fluoride copolymer which is formed by a graft, random or block copolymerization includes a vinylidene fluoride-acrylic acid copolymer, a vinylidene fluoride-methacrylic acid copolymer, a vinylidene fluoride-2-hydroxyethyl acrylate copolymer, a vinylidene fluoride-2-hydroxyethyl methacrylate copolymer, a vinylidene fluoride-2-hydroxypropyl acrylate copolymer, a vinylidene fluoride-2-hydroxypropyl methacrylate copolymer, a vinylidene fluoride-hydroxyvinyl ether copolymer, a vinylidene fluoride-glycidyl acrylate copolymer, a vinylidene fluoride-glycidyl methacrylate copolymer, a vinylidene fluoride-glycidyl vinyl ether copolymer, a vinylidene fluoride-allyl glycidyl ether copolymer, and a multi-component copolymer formed from two kinds of monomers constituting each of the aforementioned copolymers and a monomer or monomers, capable of being copolymerized such as tetrafluoroethylene, hexafluoropropylene, trifluorochloroethylene, vinyl fluoride, ethylene, propylene, an alkyl vinyl ether, fluorovinyl ether, a fluoroalkyl acrylate, a fluoroalkyl methacrylate, etc.

An example of the modified thermoplastic halocarbon copolymer further includes a modified trifluorochloroethylene-alkyl vinyl ether alternating copolymer (Lumiflon of Asahi Glass Company, Ltd.).

The process for forming these modified thermoplastic halocarbon copolymer is proposed, for example, in Japanese Patent Publication Nos. 24959/77 and 4207/85, Japanese Patent Application Laid-Open Nos. 67518/85, 67517/85, 34107/82 and 34108/82, etc.

The modified α-olefin-series polymer which forms another layer in the laminate of the present invention may be prepared from a homo- or copolymer of an α-olefin such as ethylene, propylene, butene, hexene, octene or decene. Preferable examples include polyethylene, polypropylene, an ethylene-propylene copolymer, an ethylene-butene-1 copolymer, an ethylene-4-methylpentene-1 copolymer, a propylene-butene-1 copolymer, polybutene-1, and copolymers of these α-olefins and minor amounts of diolefins or unsaturated carboxylic acid esters such as an ethylene-butadiene copolymer, a propylene-butadiene copolymer, an ethylene-vinyl acetate copolymer, and an ethylene-ethyl acrylate copolymer. Crystalline polymeric compositions which are combinations of two or more of the aforementioned homo- and copolymers are also preferable. Needless to say, these α-olefin-series polymers may be blended with commonly employed inorganic fillers, additives, pigments, etc.

The modified α-olefin-series polymer forming another layer in the laminate of the present invention is the above-defined α-olefin-series polymer or a composition thereof which incorporates at least one functional group (b) that is selected from the group consisting of a carboxyl group, an acid anhydride group, a hydroxyl group and an epoxy group but which differs from the above-described functional group (a).

The functional group (b) may be introduced into the α-olefin-series polymer by a variety of methods such as: a method wherein a polymerizable monomer having the functional group (b) is incorporated in the α-olefin-series polymer by either random, block or graft copolymerization; a method wherein the reactive group in the α-olefin-series polymer is reacted with a compound which has the functional group (b) or one which forms such functional group by reaction; and a method wherein the α-olefin-series polymer is modified by oxidation (thermal decomposition), hydrolysis or any other appropriate means. The first and third methods are preferable since they allow the functional group (b) to be readily introduced into the α-olefin-series polymer and because it is easy to control the amount of the functional group (b) to be incorporated. Graft copolymerization is particularly preferable for two reactions: first, a small amount of the functional group (b) is sufficient to provide improved adhesion and, secondly, the polymer to be used for the modification does not experience any great deterioration in its physical properties.

Monomers having a carboxyl, acid anhydride, hydroxyl or epoxy group may be properly selected from among the examples of monomers having the functional group (a).

For the purpose of providing improved adhesion to the thermoplastic halocarbon polymer, the modified α-olefin-series olymer preferably incorporates elastomers having low or no crystallinity and illustrative elastomers are α-olefin copolymerized rubbers such as ethylene-propylene rubber, ethylene-butene-1 rubber, propylene-butene-1 rubber and ethylene-propylenediene rubber. While other elastomers may be used, α-olefin copolymerized rubbers are preferable since they are highly miscible with the modified α-olefin-series polymer and help to provide improved adhesion to the modified thermoplastic halocarbon polymer. In order to provide the intended improvement in adhesion, the elastomers is incorporated in an amount ranging from 5 to 60 wt %, preferably from 10 to 50 wt %.

The modified αolefin-series polymer may incorporate other thermoplastic polymers such as, for example, polyamides and polyesters.

In order to provide high peeling strength, the modified thermoplastic halocarbon polymer and the modified αolefin-series polymer must contain at least $1 \times 10^{-3}$ mol/100 g of functional groups. In order to provide improved moldability and physical properties (e.g., balance between impact resistance and stiffness), the amount of functional groups should not exceed 0.3 mol/100 g, and the range of $5 \times 10^{-3}$ to $2 \times 10^{-1}$ mol/100 g is preferable, with the range of $1 \times 10^{-2}$ to $1 \times 10^{-1}$ mol/100 g being particularly preferable. If the amount of functional groups is within the stated ranges, the modified polymers may be used after being diluted with unmodified polymers of the same kind.

When the layers of the two modified polymers are stacked one on the other to make a laminate, the functional groups to be incorporated in the modified polymers are preferably selected such that they are capable of chemically reacting with each other. Illustrative combinations of functional groups include: (1) a carboxyl or acid anhydride group is combined with an epoxy or hydroxyl group; and (2) an epoxy group is combined with a hydroxyl group. Particularly preferable combinations are as follows: (1) a modified α-olefin-series polymer containing a carboxyl or acid anhydride group is laminated with a modified thermoplastic halocarbon polymer containing an epoxy group; and (2) a modified α-olefin-series polymer containing an epoxy group is laminated with a modified thermoplastic halocarbon polymer containing a carboxyl or acid anhydride group.

The laminate of the present invention may be fabricated by stacking the two modified polymers in a molten form by any of the known techniques such as hot pressing, heat sealing or coextrusion molding. The thickness of each polymer layer is preferably selected from the range of 1 to 1000 μm.

The laminate of the present invention may consist of three or more layers including the layers of the two modified polymers. Other layers that may serve as substrates include halocarbon polymers such as a vinyl chloride polymer, vinylidene chloride polymer and a vinylidene fluoride polymer; styrene-series polymers such as an acrylonitrile-butadiene-styrene polymer and polystyrene; acrylic polymers such as polymethyl methacrylate; α-olefin-series polymers such as polyethylene and polypropylene; rubbers such as acrylonitrile-butadiene and styrene-butadiene rubbers; metals such as aluminum and iron; thermosetting polymers such as unsaturated polyesters, epoxy polymers and urethane polymers; and engineering polymers such as thermoplastic polyesters, polycarbonates and nylon.

Specific embodiments of the laminate of the present invention are shown below, wherein the term "(inner)" and "(outer)" denote the innermost and outermost layers in the laminate, respectively; and PO, PVDF, PVDC, G.B., Ny, PET and PCa signify polyolefin, polyvinylidene fluoride, polyvinylidene chloride, gas barrier resin, polyamide, polyethylene terephthalate, and polycarbonate, respectively.

(1) (inner) metal/modified PO/modified PVDF/PVDF (optional) (outer) which may be used in weather-proof steel pipes or weather-proof or corrosion-resistant decorative steel plates;

(2) (inner) PVDF (optional)/modified PVDF/modified PO/metal (outer) which may be used in corrosion-resistant pipes (as in chemical plants) or as lining on the inner surfaces of tanks (e.g., acid cleaning tanks);

(3) (inner) PVDF (optional)/modified PVDF/modified PO/PO or crosslinked PO (optional) (outer) which may be used in hot water supply pipes, containers for chemicals of industrial grade, or bottles for reagents for use in IC fabrication (e.g., etchants and ultrapure water);

(4) (inner) PVDF (optional)/modified PVDF/modified PO/elastomer (outer) which may be used in pipes in heating systems, medical tubes or oil-resistant tubes (for automotive applications);

(5) (inner) PO or PO foam (optional)/modified PO/modified PVDF/PVDF (optional) (outer) which may be used as automotive ceilings or in outdoor pipes;

(6) laminates with other bases, which may be used in applications where various advantages of PVDF such as weather-proofness, chemical resistance, non-polluting properties, heat resistance, flame retardancy and the high purity in the absence of any additives or auxiliary agents can be exploited;

(7) (inner) PO (optional)/modified PO/modified PVDC/PVDC (optional)/modified PVDC (optional)/modified PO/PO (optional) (outer) which may be used in food packing materials;

(8) (inner) PO (optional)/modified PO/modified PVDC/PVDC (optional) (outer) which may be used in food packing materials or oil-resistant pipes;

(9) (inner) substrates/modified PO/modified PVDC/PVDC (optional) (outer) which may be used in food packing materials; and

(10) (inner) G.B./modified PO/modified PVDC/PVDC (optional)/modified PVDC (optional)/modified PO/G.B. (Ny, PET or PCa) (outer) which may be used in food packing materials.

In forming the laminate of the present invention, the individual substrates may be laminated with or without an adhesive.

The laminate of the present invention has high peeling strength and exhibits the advantages of the thermoplastic halocarbon polymer in combination with the inherent properties of the substrates with which it is laminated. Therefore, the laminate has great potential for use not only in industrial products but also in the field of household goods.

The following examples are provided for the purpose of further illustrating the present invention. In the examples, the peeling strength of each of the laminate samples was evaluated by the following procedures:

Cuts were made in the sample at intervals of 1 cm and, after peeling one end, the sample was set in an Instron type tester with the sheet of modified halocarbon polymer and that of modified α-olefin-series polymer being gripped by chucks, and a varying load was applied at a rate of 50 mm/min.

EXAMPLES 1a TO 1c

Vinylidene fluoride polymers (PVDF: Kynar 720 and 1140 of Pennwalt Corporation) and methyl methacrylateglycidyl methacrylate copolymer (MMA-GMA copolymer, with an epoxy content of 0.35 mol/100 g) were blended in the proportions shown in Table 1. The blends were kneaded at 210° C. to obtain modified PVDF compositions.

A 1-mm thick sheet of one of the so prepared compositions was bonded to a 1-mm thick sheet of maleic anhydride modified polyethylene (modified PE: MFR, 1 g/10 min.; density, 0.950 g/cm$^3$; acid anhydride content, 0.015 mol/100 g) by compression molding at 210° C., thereby fabricating a laminated sheet of the modified polyvinylidene fluoride composition and modified PE. Laminated sheets were also prepared from the other compositions of modified PVDF.

The 90° peeling strength of each of the laminated sheets was measured at a testing speed of 50 mm/min. and the results are shown in Table 1.

EXAMPLES 2a TO 2d

Seventy parts by weight of maleic anhydride modified polypropylene (modified PP: MFR, 5 g/10 min.; density, 0.91 g/cm$^3$; acid anhydride content, 0.015 mol/100 g) was blended with 30 parts by weight of ethylene-propylene rubber (EPR: ethylene content, 74 wt %; Mooney viscosity, $ML_{1+4}^{100°\ C.}$ 75) the blend was mixed at 230° C. to provide a modified PP composition.

This composition was laminated with one of the compositions of PVDF and MMA-GMA copolymer prepared in Example 1, and the 90° peeling strength of each of the so-fabricated laminates was measured as in Example 1. The results are shown in Table 1.

EXAMPLES 3a AND 3b

Seventy parts by weight of modified PP with varying acid anhydride contents as shown in Table I was blended with 30 parts by weight of the EPR used in Example 2. The blends were kneaded at 230° C. to prepare modified PP compositions.

The modified PP compositions were laminated with one of the compositions of PVDF and MMA-GMA copolymer prepared in Example 1, and the 90° peeling strength of each of the so fabricated laminates was measured as in Example 1. The results are shown in Table 1.

EXAMPLES 4a TO 4f

The modified PE used in Example 1 and the EPR used in Example 2 were blended in the proportions shown in Table 1. The blends were kneaded at 160° C. to prepare modified PE compositions.

The modified PE compositions were laminated with one of the compositions of PVDF (80 parts by weight) and MMA-GMA copolymer (20 parts by weight) prepared in Example 1. The 90° peeling strength of each of the so fabricated laminates was measured as in Example 1. The results are shown in Table 1.

COMPARATIVE EXAMPLES 1a AND 1b

An attempt was made to bond a polyethylene (PE) or polypropylene (PP) sheet to one of the compositions prepared in Example 1 from the mixture of 80 parts by weight of PVDF and 20 parts by weight of MMA-GMA copolymer employed in Example 1. However, they could not be bonded at all as shown in Table 1.

COMPARATIVE EXAMPLES 2a AND 2b

An attempt was made to bond the PVDF used in Example 1 to the modified PE or PP used in Examples 1 and 2, but they could not be bonded at all as shown in Table 1.

kneaded in an extruder at 210° C. to obtain modified PVDF compositions.

Each of the modified PVDF compositions serving to form an outer layer was fed into an extruder (40 mm$^\phi$) at 200° C.; modified PP (MFR, 1.2 g/10 min.; density, 0.89 g/cm$^3$; maleic anhydride content, 0.002 mol/100 g) serving to form an intermediate layer was fed into an extruder (45 mm$^\phi$) at 230° C.; and a propylene-series polymer (Noblen EX8 of Mitsubishi Petrochemical Co., Ltd.) serving to form an inner layer was fed into an extruder (65 mm$^\phi$) at 230° C. The three polymer fluids were laminated in a coextruding die which was set at 210° C., and the assembly was cooled to produce a multi-layered sheet consisting of the outer, intermediate

TABLE 1

| Run No. | Layer of Modified Fluorocarbon Polymer Composition ||||| Layer of Modified Polyolefin Composition |||||  Peeling Strength of Laminate (kg/cm) |
| | PVDF || MMA-GMA Copolymer || Epoxy Content (mol/ 100 g) | Modified Polyolefin ||| EPR || Acid Anhydride Content (mol/ 100 g) | |
| | Type | Content (parts by wt) | Epoxy Content (mol/ 100 g) | Content (parts by wt) | | Type | Acid Anhydride Content (mol/ 100 g) | Content (parts by wt) | Content (parts by wt) | | |
|---|---|---|---|---|---|---|---|---|---|---|---|
| Example 1a | Kynar 720 | 95 | 0.35 | 5 | 0.018 | modified PE | 0.015 | 100 | — | 0.015 | 1.0 |
| Example 1b | Kynar 720 | 90 | 0.35 | 10 | 0.035 | modified PE | 0.015 | 100 | — | 0.015 | 1.0 |
| Example 1c | Kynar 1140 | 80 | 0.35 | 20 | 0.070 | modified PE | 0.015 | 100 | — | 0.015 | 1.0 |
| Example 2a | Kynar 720 | 95 | 0.35 | 5 | 0.018 | modified PP | 0.021 | 70 | 30 | 0.015 | 2.5 |
| Example 2b | Kynar 720 | 90 | 0.35 | 10 | 0.035 | modified PP | 0.021 | 70 | 30 | 0.015 | 3.3 |
| Example 2c | Kynar 720 | 80 | 0.35 | 20 | 0.070 | modified PP | 0.021 | 70 | 30 | 0.015 | 4.0 |
| Example 2d | Kynar 1140 | 80 | 0.35 | 20 | 0.070 | modified PP | 0.021 | 70 | 30 | 0.015 | 3.4 |
| Example 3a | Kynar 720 | 80 | 0.35 | 20 | 0.070 | modified PP | 0.011 | 70 | 30 | 0.008 | 3.9 |
| Example 3b | Kynar 720 | 80 | 0.35 | 20 | 0.070 | modified PP | 0.006 | 70 | 30 | 0.004 | 3.8 |
| Example 3C | Kynar 720 | 80 | 0.35 | 20 | 0.070 | modified PP | 0.003 | 70 | 30 | 0.002 | 3.5 |
| Example 3d | Kynar 1140 | 80 | 0.35 | 20 | 0.070 | modified PP | 0.011 | 70 | 30 | 0.008 | 3.8 |
| Example 3e | Kynar 1140 | 80 | 0.35 | 20 | 0.070 | modified PP | 0.006 | 70 | 30 | 0.004 | 4.0 |
| Example 3f | Kynar 1140 | 80 | 0.35 | 20 | 0.070 | modified PP | 0.003 | 70 | 30 | 0.002 | 4.0 |
| Example 4a | Kynar 720 | 80 | 0.35 | 20 | 0.070 | modified PE | 0.015 | 90 | 10 | 0.014 | 2.0 |
| Example 4b | Kynar 720 | 80 | 0.35 | 20 | 0.070 | modified PE | 0.015 | 70 | 30 | 0.011 | 3.3 |
| Example 4c | Kynar 720 | 80 | 0.35 | 20 | 0.070 | modified PE | 0.015 | 50 | 50 | 0.008 | 4.9 |
| Example 4d | Kynar 1140 | 80 | 0.35 | 20 | 0.070 | modified PE | 0.015 | 90 | 10 | 0.014 | 1.8 |
| Example 4e | Kynar 1140 | 80 | 0.35 | 20 | 0.070 | modified PE | 0.015 | 70 | 30 | 0.011 | 6.9 |
| Example 4f | Kynar 1140 | 80 | 0.35 | 20 | 0.070 | modified PE | 0.015 | 50 | 50 | 0.008 | 4.5 |
| Comparative Example 1a | Kynar 720 | 80 | 0.35 | 20 | 0.070 | PP | 0 | 100 | — | 0 | 0 |
| Comparative Example 1b | Kynar 720 | 80 | 0.35 | 20 | 0.070 | PE | 0 | 100 | — | 0 | 0 |
| Comparative Example 2a | Kynar 720 | 100 | — | — | 0 | modified PP | 0.015 | 100 | — | 0.015 | 0 |
| Comparative Example 2b | Kynar 720 | 100 | — | — | 0 | modified PE | 0.015 | 100 | — | 0.015 | 0 |

EXAMPLE 5

PVDF (Kynar 720 of Pennwalt Corporation) in 95 and 80 parts by weight was blended with MMA-GMA copolymer (epoxy content, 0.35 mol/100 g) in 5 and 20 parts by weight, and the respective blends were and inner layers having thicknesses of 200 μm, 100 μm and 2.7 mm, respectively.

The peeling strength between the layer of modified PVDF composition and that of the modified PP in the laminated sheet having an MMA-GMA copolymer content of 5 wt % in the modified PVDF composition was 900 g/cm, and the value for the sheet having an MMA-GMA copolymer content of 20 wt % was 2,200 g/cm.

EXAMPLE 6

Two types of the modified PVDF compositions which were the same as used in Example 5 and which were intended to form an inner layer each was fed into an extruder (20 mm$^\phi$) at 200° C.; maleic anhydride modified PE serving to form an intermediate layer (MFR, 1.5 g/10 min.; density, 0.93 g/cm$^3$; maleic anhydride content, 0.0043 mol/100 g) was fed into an extruder (20 mm$^\phi$) at 220° C.; and a silane-modified ethylene-series polymer serving to form an outer layer (MFR, 0.4 g/10 min.; density, 0.95 g/cm$^3$; ultimate gel fraction, 70%) was fed into an extruder (50 mm$^\phi$) at 210° C. The three polymer fluids were laminated in a coextruding die which was set at 210° C., and the assembly was cooled to produce a multi-layered pipe with an inside diameter of 13 mm, which consisted of the inner, intermediate and outer layers having thicknesses of 200 μm, 100 μm and 1.7 mm, respectively.

The pipe was held in a steam oven (100° C.) for 16 hours until the polymer components were crosslinked. The peeling strength between the layer of modified PVDF composition and the modified PE layer in the pipe containing 5 wt % MMA-GMA copolymer in the modified PVDF composition was 540 g/5 mm, and the value for the pipe having an MMA-GMA copolymer content of 20 wt % was 590 g/5 mm.

EXAMPLE 7

Two types of the modified PVDF compositions which were the same as used in Example 5 each was laminated with a maleic acid anhydride modified ethylene-series polymer (MFR, 1.5 g/10 min.; density, 0.93 g/cm$^3$; maleic anhydride content, 0.011 mol/100 g) by compression molding at 210° C. Each of the laminated sheets was stacked on a sand-blasted steel sheet (hot-rolled steel sheet, 150×70×4 mm; sand roughness #20) by compression molding at 210° C. to fabricate a polymer-coated steel sheet consisting of the layer of modified PVDF composition (1 mm thick)/modified PE layer (1 mm)/steel sheet (4 mm).

As for the coated steel sheet containing 5 wt % MMA-GMA copolymer in the modified PVDF composition, the peeling strength between the steel sheet and the modified PE layer was 1.5 kg/cm and that between the modified PE layer and the layer of modified PVDF composition was 1.1 kg/cm. As for the coated steel sheet containing 20 wt % MMA-GMA copolymer in the modified PVDF composition, the respective values of peeling strength were 1.5 kg/cm and 1.2 kg/cm.

EXAMPLE 8

A polymer-coated steel sheet was fabricated as in Example 7 using the modified PVDF composition with an MMA-GMA copolymer content of 20 wt % (the same as in Example 7), maleic anhydride modified PP (MFR, 1.0 g/10 min.; density, 0.89 g/cm$^3$; maleic anhydride content, 0.005 mol/100 g).

The so fabricated coated steel sheet had peeling strength values of 2.5 kg/cm as between the steel sheet and the modified PP layer, and 2.2 kg/cm as between the modified PP layer and the layer of modified PVDF composition.

COMPARATIVE EXAMPLE 3

The procedures of Examples 7 and 8 were repeated except that the modified PE and modified PP were replaced by an unmodified olefin-series polymer, but it was impossible to bond the layer of olefin-series polymer to either the steel sheet or the layer of modified PVDF composition. The procedures of Examples 7 and 8 were also repeated except that the modified PVDF composition was replaced by unmodified PVDF, but no bonding strength developed between the layer of modified olefin-series polymer and the PVDF layer.

EXAMPLE 9

A polymer-coated steel sheet consisting of a layer of modified PVDF composition (0.5 mm thick)/modified PE layer (0.1 mm)/high density polyethylene layer (1.5 mm)/modified PE layer (0.1 mm)/steel sheet (4 mm) was fabricated as in Example 7 using the composition of modified PVDF with an MMA-GMA copolymer content of 20 wt % and the maleic anhydride modified PE (as used in Example 7) together with a high density polyethylene (MFR, 0.2 g/10 min.; density, 0.95 g/cm$^3$).

The coated steel sheet had a peeling strength of 1.7 kg/cm between the steel sheet and the modified PE layer, an infinite strength between the modified PE layer and the layer of high density polyethylene (i.e., the two layers could not be separated), and a value of 1.2 kg/cm between the modified PE layer and the layer of modified PVDF composition.

EXAMPLE 10

An autoclave (capacity, 1,000 ml) was charged with 400 ml of pure water, 8 g of tertiary calcium phosphate (suspension aid) and 0.012 g of sodium dodecylbenzenesulfonate. In the resulting aqueous medium, 150 g of the particles (3 to 4 mm in size) of vinylidene fluoride polymer (PVDF: Kynar 2800 of Pennwalt Corporation) were suspended by agitation. Benzoyl peroxide (1 g) was dissolved in 50 g of methyl methacrylate (MMA) and 50 g of glycidyl methacrylate (GMA) and the solution was added to the previously prepared suspension system. The interior of the autoclave was purged with nitrogen gas. The temperature in the autoclave was raised to 60° C. and the reaction mixture was stirred at that temperature for 3 hours so that the mixture of methyl methacrylate and glycidyl methacrylate containing the polymerization initiator was impregnated into the vinylidene fluoride polymer particles.

The suspension was gradually heated to 90° C. over 1 hour and polymerization was carried out at that temperature for 3 hours under stirring. The autoclave was cooled and the recovered content was washed with water, thereby producing 223 g of the particles of MMA-GMA modified vinylidene fluoride polymer (hereunder referred to as the modified PVDF). The methyl methacrylate content in the modified PVDF and the amount of its graft copolymer were 16.4 wt % and 3.3 wt %, respectively; the glycidyl methacrylate content and the amount of its graft copolymer were also 16.4 wt % and 3.3 wt %, respectively. Therefore, the epoxy content of the modified PVDF was 0.12 mol/100 g.

The modified PVDF was kneaded at 210° C. and formed into a sheet 1 mm thick. The sheet was bonded to a sheet (1 mm thick) of maleic anhydride modified polyethylene (modified PE: MFR, 1 g/10 min.; density, 0.93 g/cm³; acid anhydride content, 0.004 mol/100 g; ethylene-propylene rubber content, 20 wt %) by compression molding at 210° C. The resulting laminated sheet of modified PVDF and modified PE had a T-peeling strength of 2.9 kg/cm.

EXAMPLE 11

A blend of 70 wt % vinylidene chloride-series polymer and 30 wt % MMA-GMA copolymer was kneaded at 180° C. to prepare a composition of modified vinylidene chloride-series polymer composition.

A sheet (1 mm thick) of this composition was bonded to a sheet (1 mm) of maleic anhydride modified polyethylene (modified PE: MFR, 1 g/10 min.; density, 0.93 g/cm³; acid anhydride content, 0.004 mol/100 g; ethylene-propylene rubber content, 20 wt %) by compression molding at 180° C. The resulting laminated sheet of modified PVDF composition and modified PE had a 90° peeling strength of 1.0 kg/cm.

COMPARATIVE EXAMPLE 4

An attempt was made to bond a sheet 1 mm thick of unmodified vinylidene chloride polymer to a sheet (1 mm) of modified PE as in Example 11, but the sheets could not be bonded at all.

EXAMPLE 12

In Examples 1 to 9, a vinylidene fluoride-glycidyl methacrylate copolymer can be used in place of the composition obtained by kneading the blend of a vinylidene fluoride polymer and a methyl methacrylate-glycidyl methacrylate copolymer as modified PVDF.

The peeling strength of the laminated sheets, pipe and polymer-coated steel sheets will be, respectively, as high as those in Examples 1 to 9.

EXAMPLE 13

In Example 10, a vinylidene fluoride-glycidyl methacrylate copolymer can be used in place of the vinylidene fluoride polymer grafted by methyl methacrylate and glycidyl methacrylate as modified PVDF.

The peeling strength of the laminated sheet will be as high as that in Example 10.

EXAMPLE 14

In Example 11, a vinylidene chloride-glycidyl methacrylate copolymer can be used in place of the composition obtained by kneading the blend of a vinylidene chloride-series polymer and a methyl methacrylate-glycidyl methacrylate copolymer as modified PVDF.

The peeling strength of the laminated sheet will be as high as that in Example 11.

EXAMPLE 15

Laminates can be fabricated using a vinylidene chloride-acrylic acid copolymer and one of an ethylene-glycidyl methacrylate copolymer and a propylene-series polymer grafted by glycidyl methacrylate.

The peeling strength of the laminates will be high.

EXAMPLE 16

Laminates can be fabricated using a vinylidene fluoride-2-hydroxyethyl methacrylate copolymer and one of an ethylene-series polymer grafted by maleic anhydride and a propylene-series polymer grafted by maleic anhydride.

The peeling strength of the laminates will be high.

EXAMPLE 17

Laminates can be fabricated using Lumiflon of Asahi Glass Company, Ltd. and a polyolefin grafted by maleic anhydride.

The peeling strength of the laminates will be high.

As will be understood from the experimental data shown above, the laminate of the present invention has high peeling strength and exhibits the advantages of the thermoplastic halocarbon polymer in combination with the inherent properties of the α-olefin-series polymer with which it is laminated. Therefore, the laminate has great potential for use not only in industrial products but also in the field of household goods.

While the invention has been described in detail and with reference to specific embodiments thereof, it will be apparent to one skilled in the art that various changes and modifications can be made therein without departing from the spirit and scope thereof.

What is claimed is:

1. A laminate of a thermoplastic halocarbon polymer, which comprises:

a layered structure of at least two layers in contacting relationship, wherein one of said two layers is of a thermoplastic modified chlorocarbon polymer or a modified fluorocarbon polymer which is modified by the incorporation therein of at least one functional group (a) selected from the group consisting of carboxyl, acid anhydride, hydroxy and epoxy, and the remainder of said two layers is formed of an α-olefin series polymer modified by the incorporation thereof of at least one functional group (b) which is selected from the same group defined above for functional group (a) with the proviso that functional group (b) differs from functional group (a), each of said functional groups (a) and (b) being present in an amount of from $1 \times 10^{-3}$ to $3 \times 10^{-1}$ mol/100 g.

2. The laminate according to claim 1, wherein the thickness of each polymer layer in said laminate is within the range of from 1–1000 μm.

3. The laminate according to claim 1 wherein said chlorocarbon polymer is a modified vinylidene chloride polymer.

4. The laminate according to claim 1 wherein said fluorocarbon polymer is a modified vinylidene fluoride polymer.

5. The laminate according to claim 1 wherein each of said functional groups (a) and (b) is present in an amount ranging from $5 \times 10^{-3}$ to $2 \times 10^{-1}$ mol/100 g.

6. The laminate according to claim 1 wherein each of said functional groups (a) and (b) is present in an amount ranging from $1 \times 10^{-2}$ to $1 \times 10^{-1}$ mol/100 g.

7. The laminate according to claim 1 wherein said functional group (b) is an epoxy group when the functional group (a) is a carboxyl or acid anhydride group, and said functional group (b) is a carboxyl or acid anhydride group when the functional group (a) is an epoxy group.

8. The laminate according to claim 1 wherein said functional group (b) is a carboxyl or acid anhydride group.

9. The laminate according to claim 1 wherein said modified α-olefin-series polymer contains 5 to 60 percent by weight of an elastomer.

10. The laminate according to claim 1, wherein said modified chlorocarbon polymer is a modified thermoplastic vinylidene chloride copolymer selected from the group consisting of vinylidene chloride-acrylic acid copolymer, vinylidene chloride-methacrylic acid copolymer, vinylidence chloride-2-hydroxyethyl acrylate copolymer, vinylidene chloride-2-hydroxyethylmethacrylate copolymer, vinylidene chloride-2-hydroxypropylacrylate copolymer, vinylidene chloride-2-hydroxypropylmethacrylate copolymer, vinylidene chloride-hydroxyvinylether copolymer, vinylidene chloride-glycidylacrylate copolymer, vinylidene chloride-glycidylmethacrylate copolymer, vinylidene chloride-glycidylvinylether and copolymer, vinylidene chloride-allylglycidylether copolymer.

11. The laminate according to claim 1, wherein said fluorocarbon polymer is a modified thermoplastic vinylidene fluoride copolymer selected from the group consisting of vinylidene fluoride-acrylic acid copolymer, vinylidene fluoride-methacrylic acid copolymer, vinylidene fluoride-2-hydroxyethylacrylate copolymer, vinylidene fluoride-2-hydroxyethylmethacrylate copolymer, vinylidene fluoride-2-hydroxypropylacrylate copolymer, vinylidene fluoride-2-hydroxypropylmethacrylate copolymer, vinylidene fluoride-hydroxyvinylether copolymer, vinylidene fluoride-glycidylacrylate copolymer, vinylidene fluoride-glycidylmethacrylate copolymer, vinylidene fluoride-glycidylvinylether copolymer, and vinylidene fluoride-allylglycidylether copolymer.

12. The laminate according to claim 1, wherein said α-olefin series polymer is a member selected from the group consisting of polyethylene, polypropylene, ethylene-propylene copolymer, ethylene-butene-1 copolymer, ethylene-4-methylpentene-1 copolymer, propylene-butene-1 copolymer and polybutene-1.

13. The laminate according to claim 1, wherein said α-olefin series polymer is a member selected from the group consisting of ethylene-butadiene copolymer, propylene-butadiene copolymer, ethylene-vinylacetate copolymer and ethylene-ethylacrylate copolymer.

14. The laminate according to claim 1, wherein the said layers of said laminate are placed upon a substrate layer prepared from a material selected from the group consisting of polyvinyl chloride, polyvinylidene chloride, polyvinylidene fluoride, acrylonitrile-butadiene-styrene copolymer, polystyrene, polymethylmethacrylate, polyethylene, polypropylene, acrylonitrile-butadiene rubber, styrene-butadiene rubber, aluminum, iron, an unsaturated polyester, an epoxy polymer, a urethane polymer, a thermoplastic polyester, a polycarbonate and nylon.

* * * * *